(12) United States Patent
Curtis et al.

(10) Patent No.: US 7,186,332 B2
(45) Date of Patent: Mar. 6, 2007

(54) ORBITAL WASTEWATER TREATMENT SYSTEM WITH COMBINED SURFACE AERATOR AND SUBMERGED IMPELLER

(75) Inventors: Betty Ann Curtis, Waukesha, WI (US); Frederick M Riser, Salt Lake City, UT (US); John Vorwaller, Keller, TX (US)

(73) Assignee: GL&V Management, Hungary KFT, Budapest (HU)

( * ) Notice: Subject to any disclaimer, the term of this patent is extended or adjusted under 35 U.S.C. 154(b) by 243 days.

(21) Appl. No.: 10/835,707

(22) Filed: Apr. 30, 2004

(65) Prior Publication Data

US 2005/0242015 A1   Nov. 3, 2005

(51) Int. Cl.
*B01D 33/70* (2006.01)
(52) U.S. Cl. ............... 210/150; 210/167; 210/194; 210/220
(58) Field of Classification Search ............ 210/150, 210/167, 194, 220
See application file for complete search history.

(56) References Cited

U.S. PATENT DOCUMENTS

| 4,869,818 A | 9/1989 | DiGregorio et al. |
| 5,234,595 A * | 8/1993 | DiGregorio et al. ....... 210/605 |

* cited by examiner

*Primary Examiner*—Chester T. Barry
(74) *Attorney, Agent, or Firm*—Coleman Sudol Sapone, PC; Michael Polacek, Esq.

(57) ABSTRACT

An orbital wastewater treatment system includes a tank and a partition disposed in the tank to define a pair of channels in the tank. The tank has a turning wall bounding contiguous portions of the channels. The partition has an end spaced from the turning wall, whereby the channels communicate with one another. A driven shaft is disposed vertically in the tank between the end of the partition and the turning wall. The driven shaft is provided at an upper end with a surface aerator and at a lower end with a horizontal impeller. At least one baffle member is disposed in the tank partially about a lower end of the shaft including the impeller.

25 Claims, 6 Drawing Sheets

ORBITAL WASTEWATER TREATMENT SYSTEM WITH COMBINED SURFACE AERATOR AND SUBMERGED IMPELLER

FIELD OF THE INVENTION

This invention relates to an orbital-type wastewater treatment system utilizing activated sludge. More particularly, this invention relates to an improved means for propelling the mixed liquor within the essentially closed orbital circuit tank.

BACKGROUND OF THE INVENTION

U.S. Pat. No. 4,869,818 discloses an orbital-type wastewater treatment system wherein an activated sludge or liquor is propelled around an elongated interior partition wall forming at least two parallel connected channels by a pump in the form of a vertical shaft provided with an aerator at an upper end and an impeller at a lower end. The pump is spaced from an end of the partition wall.

The orbital system of U.S. Pat. No. 4,869,818 represents an improvement in an orbital system 10, shown in FIG. 1 and known as a Carrousel® system, in which highly efficient aeration is provided by a series of low speed (about 25 to about 55 rpm) surface aerators 20, 21, 22 mounted at turning walls or communication sections 12, 14, 16 in a racetrack configuration formed by an outer tank wall 11, a series of partition walls 17, 18, 19 and additional turning walls 13, 15, normally all walls being constructed of concrete. The aerators act to provide mixed liquor mixing, aeration of the mixed liquor of waste water and activated sludge, and provide a plug flow of mixed liquor through the channels 28, 29 between the aerators and between either a partition and outer wall or between partitions. Residence times of 24 hours are common with the wastewater making dozens of cycles around the overall circuit. Turning vanes 23, 24 are also typically employed in the channels to improve hydraulic efficiency. Influent enters the system by pipe 9 at one or more of the surface aerators. Level of the mixed liquor is controlled by a motor controlled weir 25 which also functions to remove mixed liquor from the top surface of the system. Each orbital basin is custom designed based on individual design parameters such as influent quantity and characteristics, desired effluent levels, site size and shape, and population and industries served and to-be-served in the future.

FIG. 2 illustrates the improvement introduced into the Carrousel orbital system pursuant to the disclosure of U.S. Pat. No. 4,869,818. A mixed liquor pump includes an auxiliary radial flow submerged impeller 32 provided at or adjacent to an end of a shaft extension 31 underneath the surface aerator 30 and extending from the surface aerator shaft 43. The impeller 32 provides for additional pumping and resulting propulsion of the mixed liquor in the channels by reason of the location of the radial flow impeller with respect to a bottom end edge 40 of the partition wall 17 forming the particular channel. The vertical axis of the surface aerator and the radial impeller are generally approximately aligned with the longitudinal axis of its associated partition, i.e. the axis of impeller 32 and the longitudinal axis of wall 17, but may be slightly displaced. The lower radial flow impeller thus pumps mixed liquor in the same direction and directional manner as the surface aerator but a portion of the pumping energy is located adjacent to the tank or basin bottom 26. The basin may contain a deepened well area 36 which aids in the vertical mixing of mixed liquor by the surface aerator as shown by curved arrows 33. Dotted curved arrows show mixing behind the vertical partition 17 while straight dotted arrows 34 show the required velocity component resultant from the pumping action of both the surface aerator 30 and the lower radial flow impeller 32. The drive shaft 43 and the shaft extension 31 are rotatively driven together by motor 26 operating through a gear box 27 to provide the desired speed(s) of rotation. By reason of the additional lower impeller, the allowable basin depth is substantially increased by about at least 10% to 35% so that basin depths of from 2.5 to about 6.0 meters or greater can be utilized for the main channels 28, 29.

SUMMARY OF THE INVENTION

The present invention is directed to the problem of enhancing even further the pumping efficiency of liquor pumps in orbital wastewater treatment systems such as described in U.S. Pat. No. 4,869,818.

The present invention contemplates the provision of a fluid guide or liquor-deflecting baffle that partially surrounds the pump at the lower end thereof. This baffle may increase average liquor velocity by up to 15–20% over conventional designs.

An orbital wastewater treatment system comprises, in accordance with the present invention, a tank and a partition disposed in the tank to define a pair of channels in the tank. The tank has a turning wall bounding contiguous portions of the channels. The partition has an end spaced from the turning wall, whereby the channels communicate with one another. A driven shaft is disposed vertically in the tank between the end of the partition and the turning wall. The driven shaft is provided at an upper end with a surface aerator and at a lower end with a horizontal impeller. At least one baffle member is disposed in the tank partially about a lower end of the shaft including the impeller.

Between the aerator and the impeller, the shaft may be provided with an additional impeller. This impeller is preferably, but not necessarily, disposed at the lower end of the shaft so that the baffle member partially surrounds both impellers.

In some embodiments of the present invention, the baffle member is spaced from a floor surface of the tank. The baffle member may be attached on one side to the partition and may extend about the impeller through an angle of between about 90 degrees and about 270 degrees. In a preferred embodiment of the invention, the baffle member extends through an angle of about 180 degrees about the impeller. This baffle member extends from the partition and is located only on an upstream side of the impeller.

In some embodiments of the present invention, the baffle member is attached to a floor surface of the tank. The baffle member may take the form of a cylindrical section extending upwardly from the floor surface. In one preferred embodiment of the present invention, such a baffle member extends about the impeller through an angle of about 180 degrees and is disposed on a side of the impeller opposite the partition. The baffle member in this case is disposed between the impeller and the turning wall of the tank and extends generally symmetrically about the plane of the partition, into both channels.

Where baffle member includes a cylindrical section extending upwardly from the floor surface of the tank, the baffle member may define an inlet opening communicating with an upstream one of the channels and an outlet opening communicating with a downstream one of the channels. The baffle member thus creates a chamber about the impeller and the lower end of the driven shaft.

Pursuant to a further feature of the present invention, the baffle member in every case has an inwardly facing surface in the form of a cylindrical section. The inwardly facing surface preferably extends through an angle of between about 90 degrees and about 270 degrees.

In a preferred embodiment of the present invention, the baffle member is attached on one side to the partition and spaced from a floor surface of the tank. More preferably, the baffle member extends about the impeller through an angle of about 180 degrees.

In another preferred embodiment of the present invention, the baffle member takes the form of a cylindrical section attached to and extending upwardly from a floor surface of the tank, the baffle member being disposed on a side of the impeller opposite the partition. More preferably, the baffle member extends about the impeller through an angle of about 180 degrees.

A method of constructing or installing an orbital wastewater treatment system in accordance with the present invention includes providing at least one baffle member, disposing the baffle member in the tank so that the baffle can partially surround a lower end of a driven shaft including an impeller, and attaching the baffle member to at least one of the partition and a floor surface of the tank. These same steps can be performed in a retrofit procedure.

The present invention further contemplates a retrofit assembly comprising (a) a shaft member provided with a surface aerator and an impeller and (b) a baffle disposable in an orbital wastewater treatment tank partially about a lower end of the shaft including the impeller. The assembly may include brackets, pillars, nuts and bolts and/or other mounting elements for attaching the shaft and the baffle to the tank.

The present invention provides a fluid moving assembly for an orbital wastewater treatment system including a tank and a partition disposed in the tank to define a pair of channels in the tank, the tank having a turning wall bounding contiguous portions of the channels, the partition having an end spaced from the turning wall, whereby the channels communicate with one another. The fluid moving assembly comprises a driven shaft disposable vertically in the tank between the end of the partition and the turning wall, a surface aerator provided at an upper end of the shaft, a first horizontal impeller provided at a lower end of the shaft, and a second horizontal impeller provided on the shaft between the aerator and the first horizontal impeller. Preferably, both horizontal impellers are provided at the lower end of the shaft so that both impellers may be partially surrounded by a baffle member such as that described above.

The present invention also provides a fluid moving assembly for an orbital wastewater treatment system, wherein at least one horizontal impeller is provided with adjustable blades for varying power consumption of the fluid moving assembly. The blades may be disposable at an adjustable distance from the shaft. Alternatively or additionally, the blades may have an adjustable effective area. The effective area (for varying the reaction torque exerted on the shaft during driving operations) may be modified by changing the pitch or angle of the blades or by alternately increasing and decreasing the blade size.

DETAILED DESCRIPTION OF THE PREFERRED EMBODIMENTS

Figure 1:
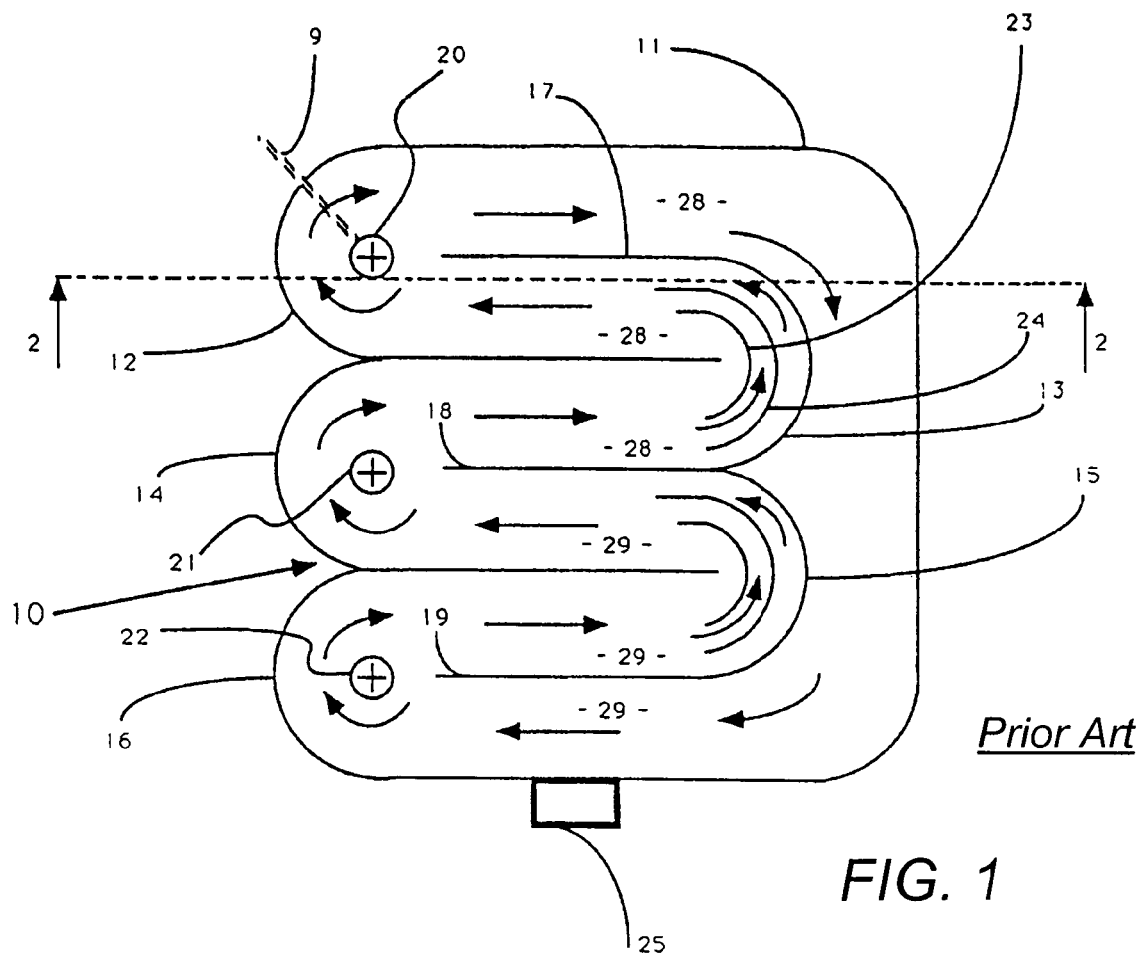
FIG. 1 is a schematic plan view of a typical orbital wastewater treatment system in which the present invention may be employed.
Figure 2:
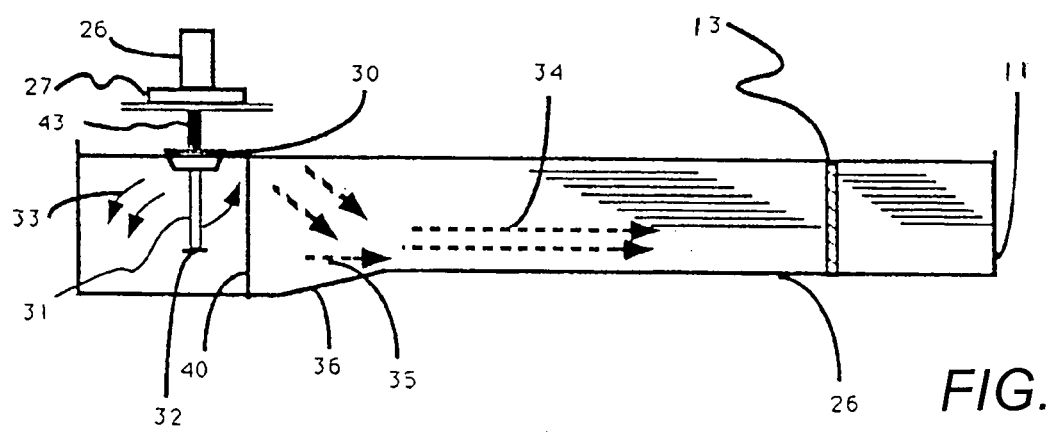
FIG. 2 is a schematic side view of an orbital system taken along line 1—1 in FIG. 1.
Figure 3:
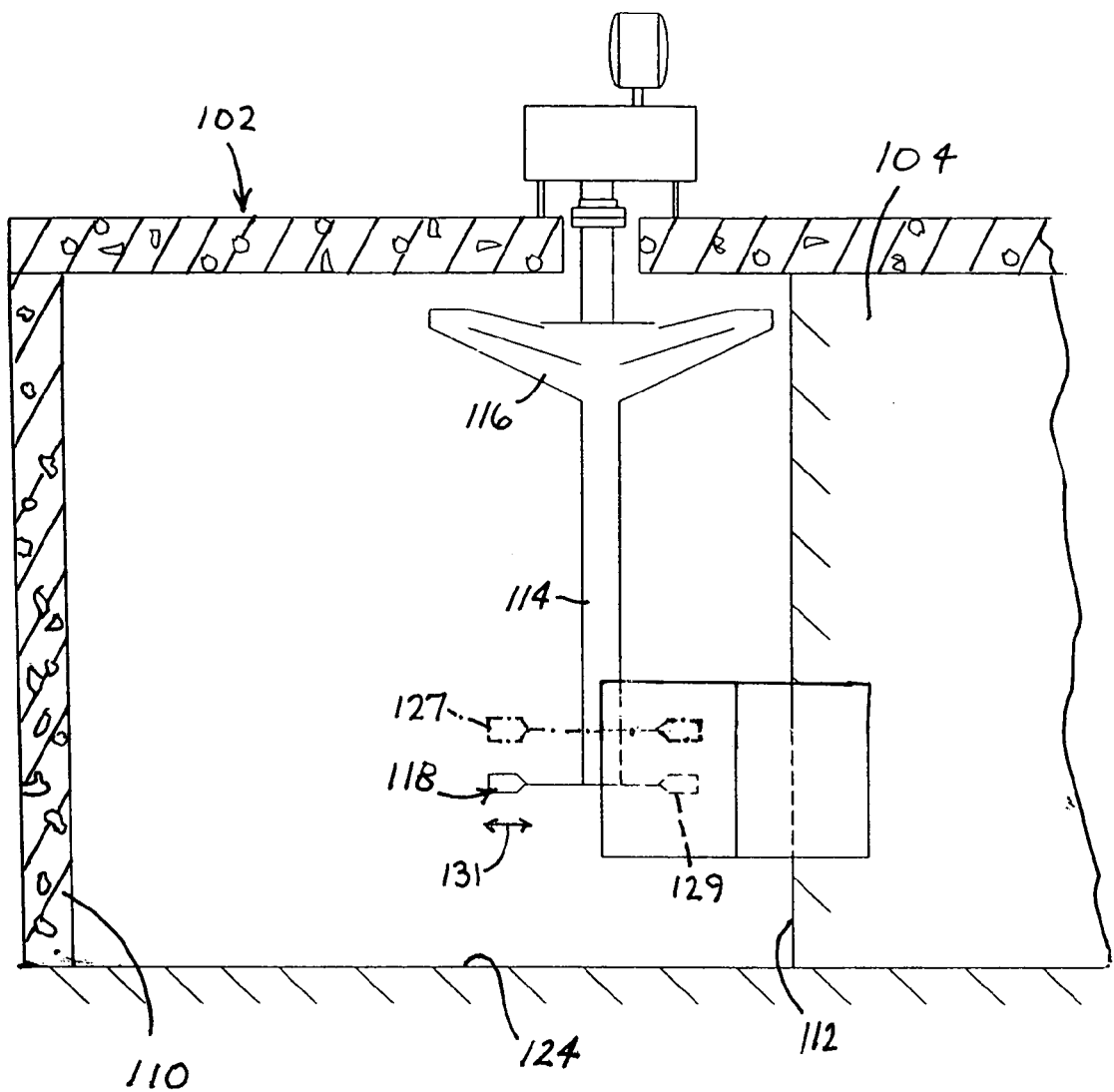
FIG. 3 is a schematic partial vertical cross-sectional view of an orbital wastewater treatment system provided with a baffle in accordance with the present invention.
Figure 4:
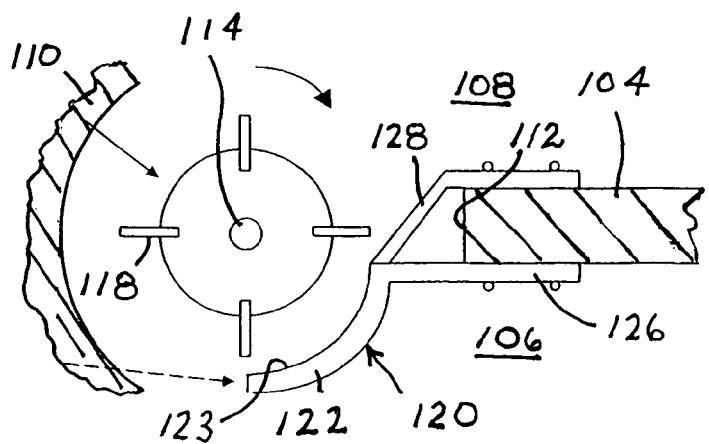
FIG. 4 is a schematic top plan view of an impeller, a tank partition, and the baffle all shown in FIG. 1.

As illustrated in FIGS. 3 and 4, an orbital wastewater treatment system comprises a tank 102 and a partition 104 disposed in the tank to define an upstream channel 106 and a downstream channel 108 in the tank. Tank 102 includes a turning wall 110 bounding channels 106 and 108 where they are contiguous with one another. Partition 104 has an end 112 spaced from wall 110, forming an opening therewith by which channels 106 and 108 communicate with one another. A driven shaft 114 is disposed vertically in tank 102 between partition end 112 and turning wall 110. Shaft 114 is provided at an upper end with a surface aerator 116 and at a lower end with a horizontal impeller 118. At least one baffle member 120 is disposed in tank 102 partially about a lower end of shaft 114 including the impeller 118.

Baffle member 120 includes a cylindrical section 122 with a cylindrical surface 123 facing inwardly towards impeller 118. Cylindrical baffle section 122 extends through an angle of 90 degrees about impeller 118 and is spaced from a floor surface 124 of tank 102. Baffle section 122 extends from partition 104 into channel 106 and is located only on an upstream side of impeller 118, i.e., only in channel 106. Baffle member 120 is attached on one side to partition 104 via a flange 126 and a bracket 128.

As further illustrated in FIG. 3, the fluid moving assembly or pump comprising shaft 114, aerator 116, and impeller 118 may be augmented by the provision of an additional horizontal impeller 127 on the shaft between the aerator and impeller 118. Impellers 118 and 127 are both provided at the lower end of shaft 114 so that they may be partially surrounded by the same baffle member 120. One or both impellers 118 and 127 may be provided with adjustable blades 129 for varying power consumption of the fluid moving assembly or pump. Blades 129 may be disposable at an adjustable distance from the shaft, as indicated by an arrow 131. Alternatively or additionally, blades 129 may be mounted to shaft 114 at a variable pitch or angle of inclination with respect to the vertical. In another alternative embodiment, blades 129 may have an adjustable size, for instance, by means of telescoping or relatively sliding blade parts. Adjusting the blades 129 in these cases alters the effective area and thereby varies the reaction torque exerted on shaft 114 during driving operations. Adjustment of blades 129 may be implemented by simply loosening bolts, moving the blades, and retightening the bolts.

For purposes of simplicity, tank 102, including turning wall 110, and aerator 116 are omitted from FIGS. 5A through 9B. With respect to tank 102, turning wall 110, and aerator 116, reference should be made to FIGS. 3 and 4. Elements common to the embodiment of FIGS. 3 and 4, on the one hand, and the embodiments of other drawing figures, are designated with the same reference numerals. Those common elements include partition 104, end 112, channels 106 and 108, shaft 114, impeller 118, and tank floor 124.

Figure 5A:
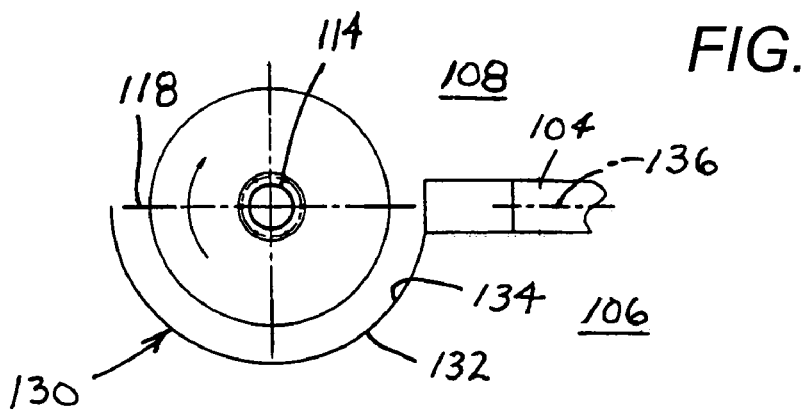
FIG. 5A is a schematic top plan view of an impeller, a tank partition, and a baffle in another orbital wastewater treatment system in accordance with the present invention.
Figure 5B:
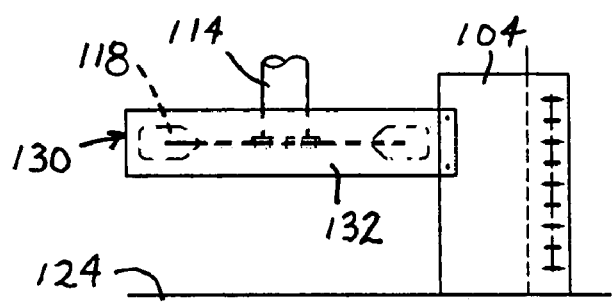
FIG. 5B is a schematic side elevational view of the impeller, the tank partition, and the baffle of FIG. 5A.

As diagrammatically depicted in FIGS. 5A and 5B, another orbital wastewater treatment system includes a baffle member 130 disposed in tank 102 partially about a lower end of shaft 114 including impeller 118. Baffle member 130 includes a cylindrical section 132 with a cylindrical surface 134 facing inwardly towards impeller 118. Cylindrical baffle section 132 extends through an angle of 180 degrees about impeller 118 and is spaced from floor surface 124 of tank 102. Baffle section 132 extends from partition 104 into channel 106 and is located essentially only on an upstream side of impeller 118, i.e., only in channel 106, as defined by a plane 136 of partition 104.

Figure 6A:
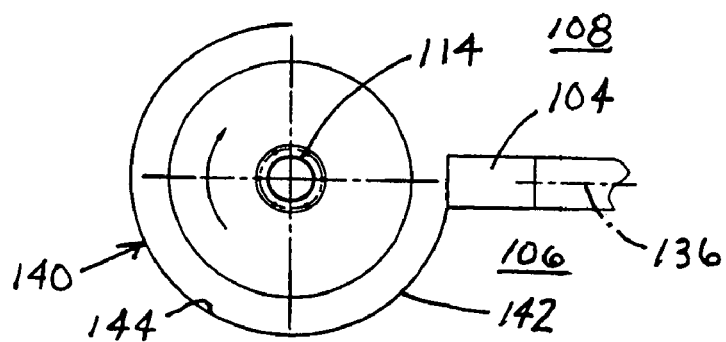
FIG. 6A is a schematic top plan view of an impeller, a tank partition, and a baffle in a further orbital wastewater treatment system in accordance with the present invention.
Figure 6B:
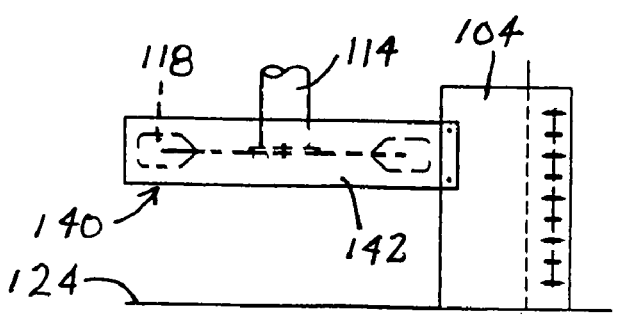
FIG. 6B is a schematic side elevational view of the impeller, the tank partition, and the baffle of FIG. 6A.

As schematically shown in FIGS. 6A and 6B, a further orbital wastewater treatment system includes a baffle member 140 disposed in tank 102 partially about a lower end of shaft 114 including impeller 118. Baffle member 140 includes a cylindrical section 142 with a cylindrical surface 144 facing inwardly towards impeller 118. Cylindrical baffle section 142 extends through an angle of 270 degrees about impeller 118 and is spaced from floor surface 124 of tank 102. Baffle section 142 extends from partition 104 into channel 106 and is located on both an upstream side and a downstream side of impeller 118, i.e., in both channels 106 and 108, as defined by plane 136 of partition 104.

Figure 7A:
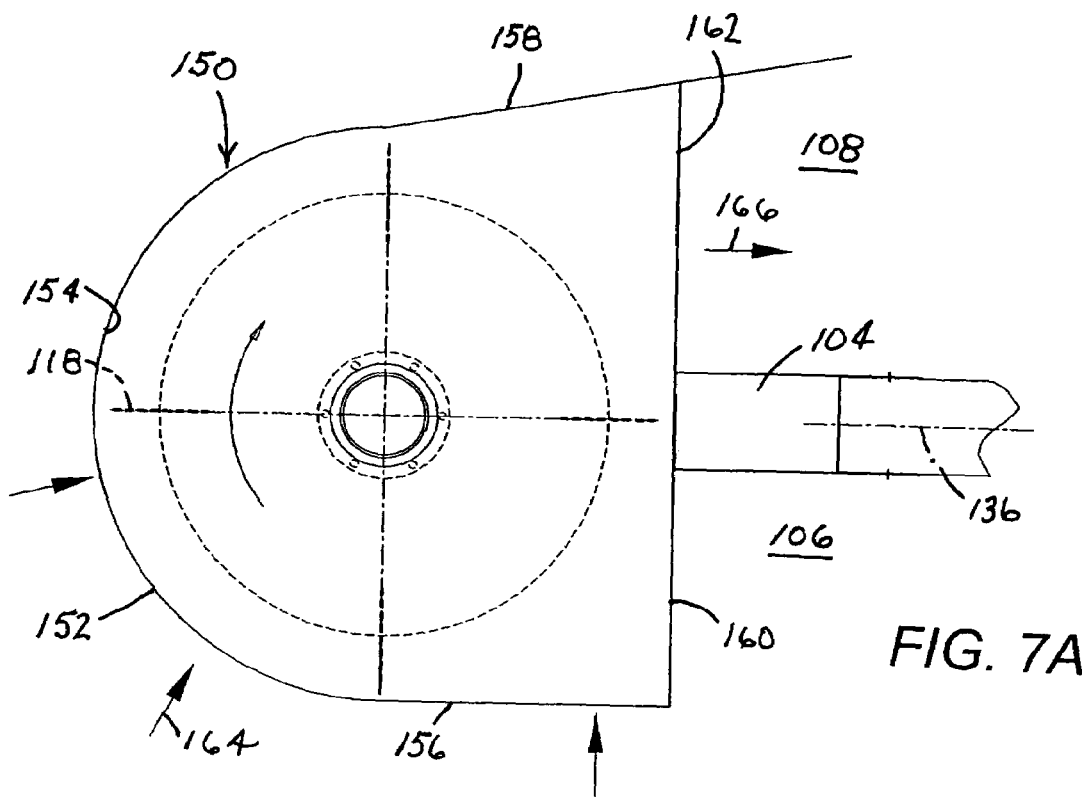
FIG. 7A is a schematic top plan view of an impeller, a tank partition, and a baffle chamber in an additional orbital wastewater treatment system in accordance with the present invention.
Figure 7B:
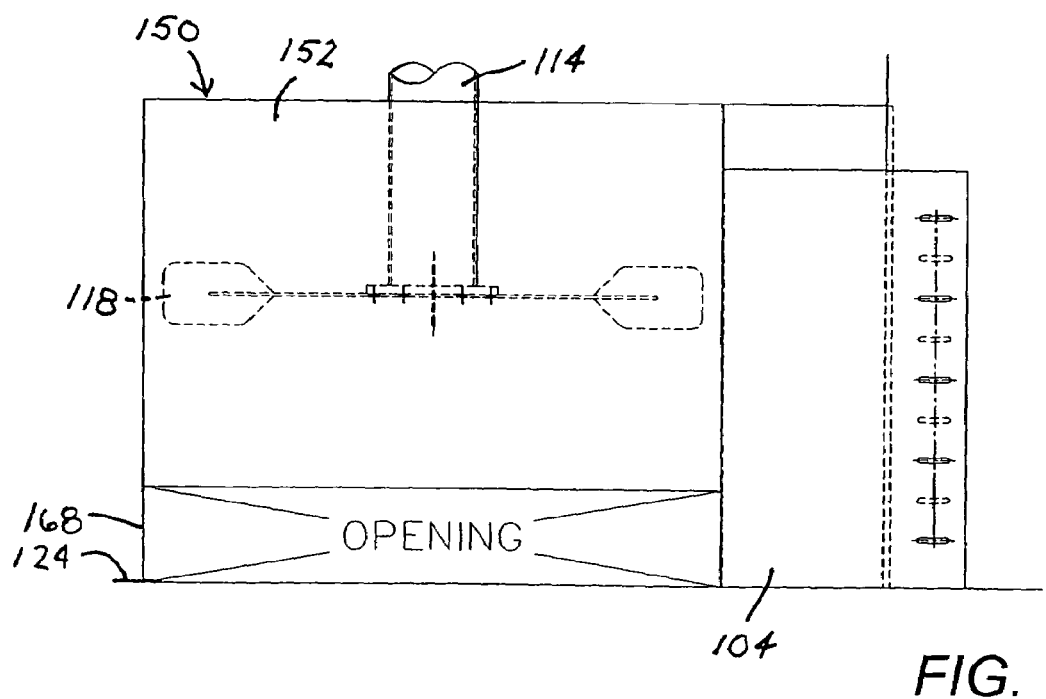
FIG. 7B is a schematic side elevational view of the impeller, the tank partition, and the baffle chamber of FIG. 7A.

As illustrated in FIGS. 7A and 7B, a further orbital wastewater treatment system includes a baffle member 150 disposed in tank 102 partially about a lower end of shaft 114 including impeller 118. Baffle member 150 includes a cylindrical section 152 with a cylindrical surface 154 facing inwardly towards impeller 118. Cylindrical section 152 extends through an angle of 180 degrees about impeller 118 and is spaced from floor surface 124 of tank 102. Cylindrical section 152 of baffle member 150 is located on a side of shaft 114 opposite partition end 112, that is, between shaft 114 and turning wall 110 (FIG. 3). Baffle member 150 further includes a first planar baffle section 156 extending from cylindrical baffle section 152 upstream into channel 106 and a second planar baffle section 158 extending from cylindrical baffle section 152 downstream into channel 108. Upstream baffle section 156 is parallel to the plane 136 of partition 104, while downstream baffle section 158 is angled away from plane 136. Upstream and downstream baffle sections 156 and 158 are fixed to partition 104 via flanges or brackets 160 and 162 that take the form of plates spaced from floor 124 of tank 102. Arrows 164 and 166 indicate the direction of liquor flow from channel 106 into channel 108 during rotation of shaft 114. Baffle member may be cantilevered from partition 104. Alternatively, one or more upright braces 168 may be provided for supporting the baffle member on floor 124. Baffle member 150, including flanges or brackets 160 and 162, defines a chamber about impeller 118. Generally, it is contemplated that this chamber is open on both upper and lower sides. However, there may be applications in which the upper side in particular is partially closed by one or more horizontal plates (not shown).

Figure 8A:
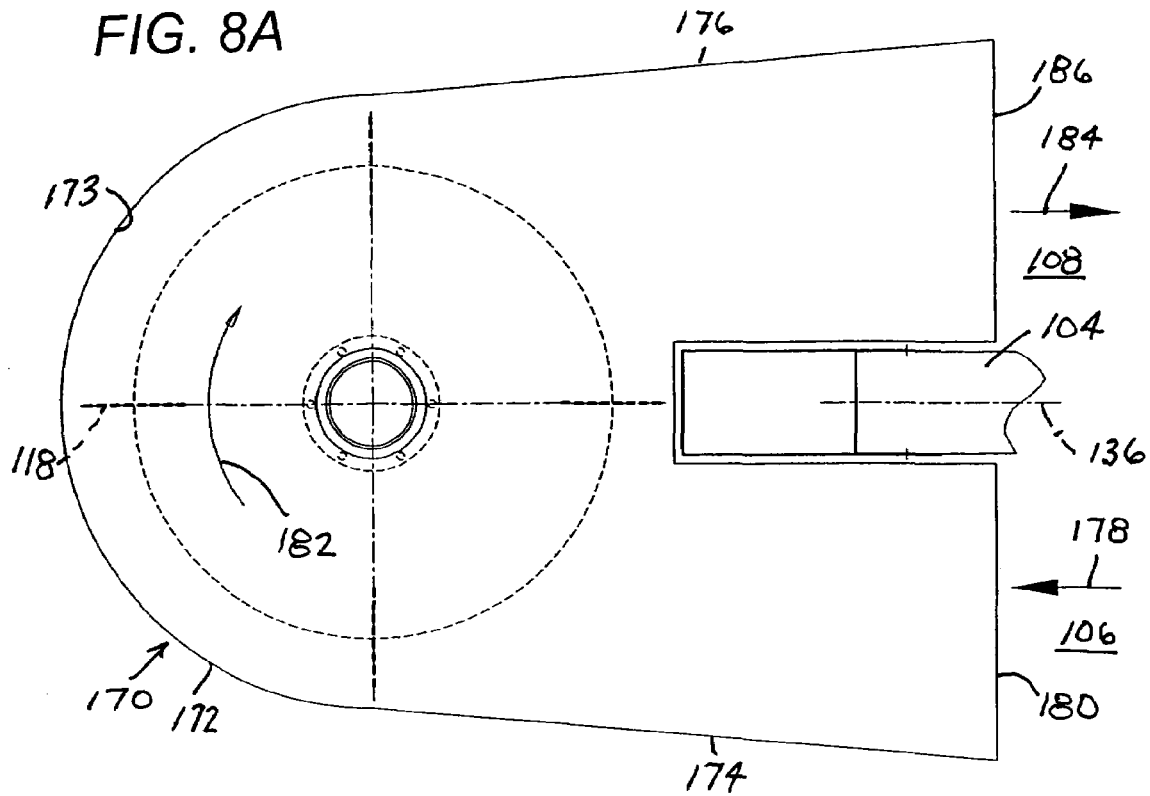
FIG. 8A is a schematic top plan view of an impeller, a tank partition, and a baffle chamber in yet another orbital wastewater treatment system in accordance with the present invention.
Figure 8B:
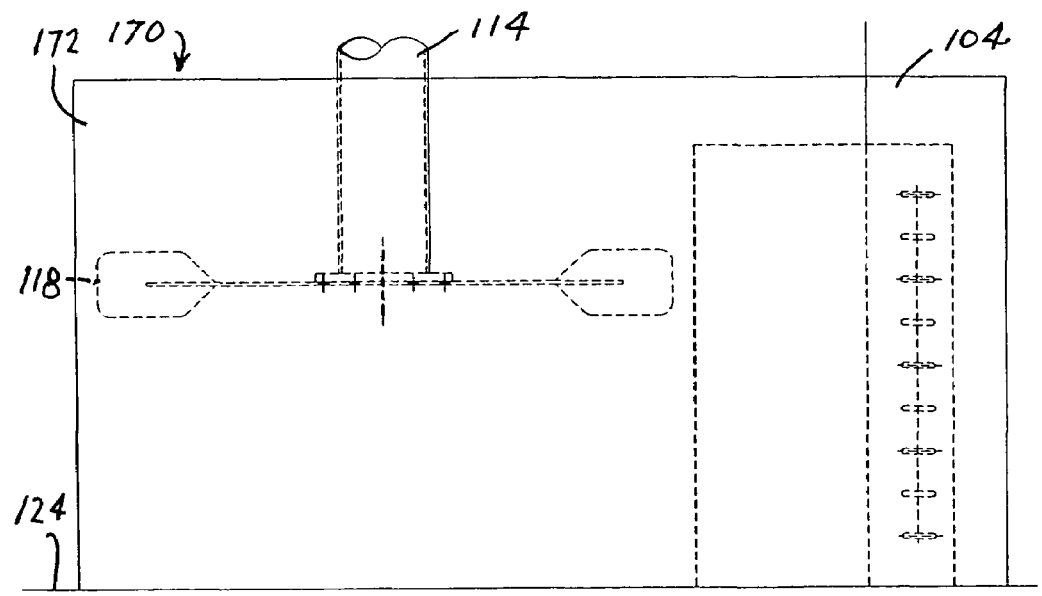
FIG. 8B is a schematic side elevational view of the impeller, the tank partition, and the baffle chamber of FIG. 8A.

As illustrated in FIGS. 8A and 8B, yet another orbital wastewater treatment system includes a baffle member 170 disposed in tank 102 partially about a lower end of shaft 114 including impeller 118. Baffle member 170 includes a cylindrical section 172 with a cylindrical surface 173 facing inwardly towards impeller 118. Cylindrical section 172 is attached to and extends upwardly from tank floor surface 124. Cylindrical section 172 extends through an angle of 180 degrees about impeller 118 is located on a side of shaft 114 opposite partition end 112, that is, between shaft 114 and turning wall 110 (FIG. 3). Baffle member 170 further includes a first planar baffle section 174 extending from cylindrical baffle section 172 upstream into channel 106 and a second planar baffle section 176 extending from cylindrical baffle section 172 downstream into channel 108. Both upstream baffle section 174 and downstream baffle section 176 are angled away from plane 136. Like cylindrical baffle section 172, upstream and downstream baffle sections 174 and 176 also extend upwardly from tank floor 124. Baffle member 170 defines a chamber about impeller 118. Generally, it is contemplated that this chamber is open on an upper side. However, there may be applications in which the upper side is partially closed by one or more horizontal plates (not shown). An arrow 178 indicates the direction of liquor flow through an inlet opening 180 between planar baffle section 174 and partition 104. Another arrow 182 indicates the direction of liquor flow about impeller 118, while a third arrow 184 indicates the direction of liquor flow through an outlet opening 186 between planar baffle section 176 and partition 104.

Figure 9A:
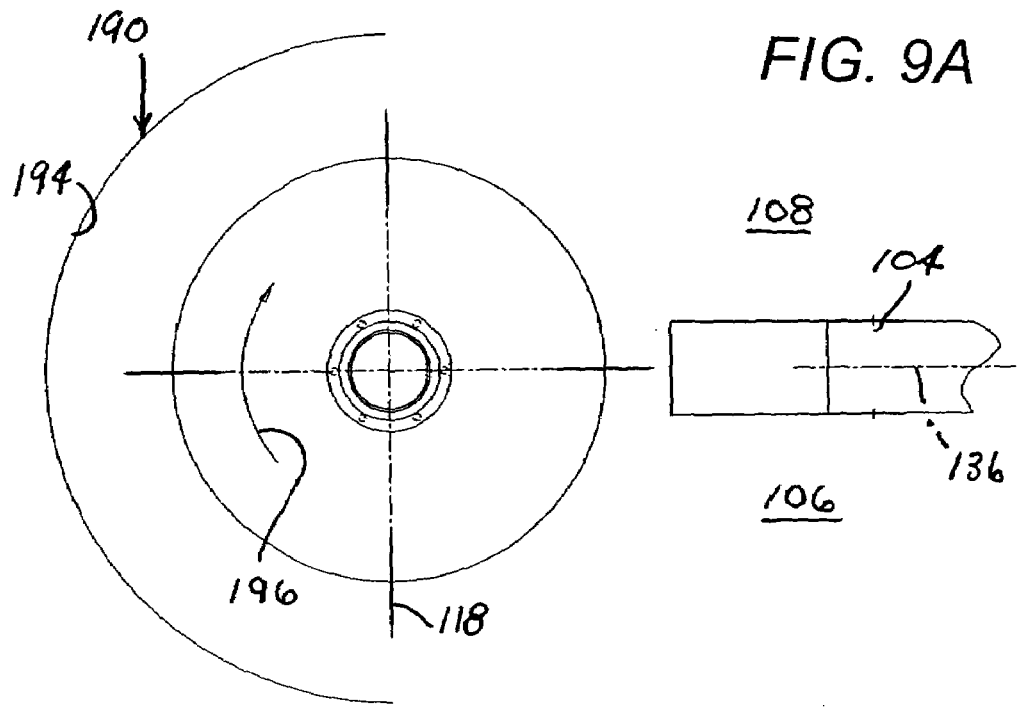
FIG. 9A is a schematic top plan view of an impeller, a tank partition, and a baffle in yet a further orbital wastewater treatment system in accordance with the present invention.
Figure 9B:
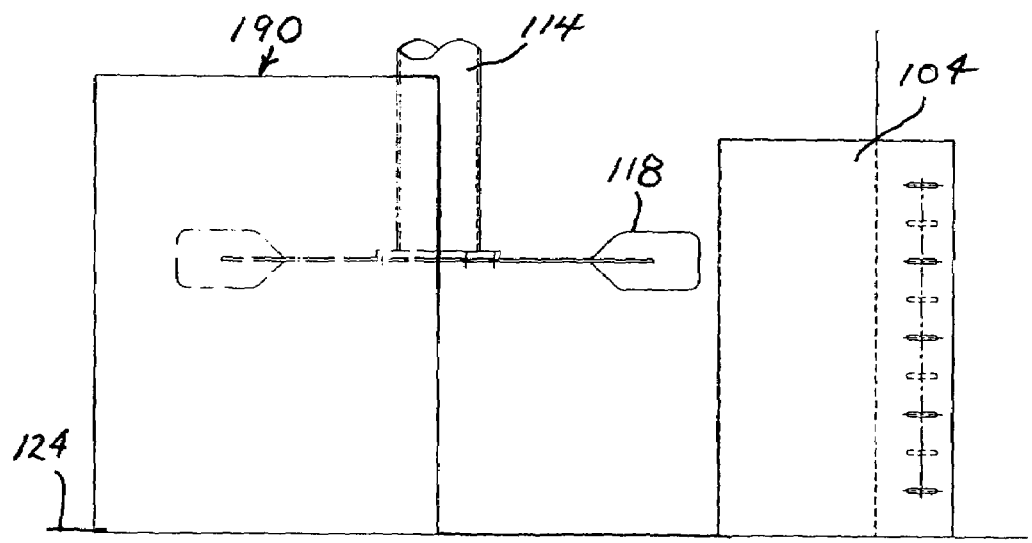
FIG. 9B is a schematic side elevational view of the impeller, the tank partition, and the baffle of FIG. 9A.

As illustrated in FIGS. 9A and 9B, yet a further orbital wastewater treatment system includes a baffle member 190 disposed in tank 102 partially about a lower end of shaft 114 including impeller 118. Baffle member 190 takes the form of a free-standing cylindrical section with a cylindrical surface 194 facing inwardly towards impeller 118. Baffle member 190 extends through an angle of 180 degrees about impeller 118, upwardly from tank floor surface 124, to which the baffle is attached. Baffle 190 is located on a side of shaft 114 opposite partition end 112, that is, between shaft 114 and turning wall 110 (FIG. 3) and extends generally symmetrically about the plane 136 of partition 104, into both channels 106 and 108. An arrow 196 indicates the direction of impeller rotation and the direction of liquor flow from channel 106 to 108.

Although the invention has been described in terms of particular embodiments and applications, one of ordinary skill in the art, in light of this teaching, can generate additional embodiments and modifications without departing from the spirit of or exceeding the scope of the claimed invention. For example, pillars or columns on the tank floor may wholly or partially support a baffle member that is spaced from the tank floor. Alternatively, a baffle member as described herein may be suspended from a roof or cover of the tank. Accordingly, it is to be understood that the drawings and descriptions herein are proffered by way of example to facilitate comprehension of the invention and should not be construed to limit the scope thereof.

What is claimed is:

1. An orbital wastewater treatment system comprising:
   a tank;
   a partition disposed in said tank to define a pair of channels in said tank, said tank having a turning wall bounding contiguous portions of said channels, said partition having an end spaced from said turning wall, whereby said channels communicate with one another;
   a driven shaft disposed vertically in said tank between said end of said partition and said turning wall, said driven shaft being provided at an upper end with a surface aerator and at a lower end with at least one horizontal impeller; and
   at least one baffle member disposed in said tank partially about a lower end of said shaft including said impeller.

2. The system defined in claim 1 wherein said baffle member is spaced from a floor surface of said tank.

3. The system defined in claim 2 wherein said baffle member is attached on one side to said partition.

4. The system defined in claim 3 wherein said baffle member extends about said impeller through an angle of between about 90 degrees and about 270 degrees.

5. The system defined in claim 4 wherein said baffle member extends through an angle of about 180 degrees.

6. The system defined in claim 1 wherein said baffle member is attached to a floor surface of said tank.

7. The system defined in claim 6 wherein said baffle member is a cylindrical section extending upwardly from said floor surface.

8. The system defined in claim 7 wherein said baffle member extends about said impeller through an angle of about 180 degrees and is disposed on a side of said impeller opposite said partition.

9. The system defined in claim 6 wherein said baffle member includes a cylindrical section extending upwardly from said floor surface, said baffle member defining an inlet opening communicating with an upstream one of said channels and an outlet opening communicating with a downstream one of said channels.

10. The system defined in claim 1 wherein said baffle member has an inwardly facing surface in the form of a cylindrical section.

11. The system defined in claim 10 wherein said inwardly facing surface extends through an angle of between about 90 degrees and about 270 degrees.

12. The system defined in claim 1 wherein said shaft is provided at said lower end with at least two horizontal impellers.

13. The system defined in claim 12 wherein said baffle member partially surrounds said two horizontal impellers.

14. The system defined in claim 1 wherein said at least one horizontal impeller has adjustable blades for varying power consumption of said shaft.

15. The system defined in claim 14 wherein said blades are disposable at an adjustable distance from said shaft.

16. The system defined in claim 1 wherein said baffle member is mounted to said partition.

17. The system defined in claim 1 wherein said baffle member is mounted to a floor surface of said tank and extends upwardly therefrom.

18. The system defined in claim 1 wherein said baffle member forms about said impeller a chamber having an inlet opening communicating with an upstream one of said channels and an outlet opening communicating with a downstream one of said channels.

19. The system defined in claim 1 wherein said baffle member is attached on one side to said partition and is spaced from a floor surface of said tank.

20. The system defined in claim 1 wherein said baffle member is a cylindrical section.

21. An orbital wastewater treatment system comprising:
    a tank;
    a partition disposed in said tank to define a pair of channels in said tank, said tank having a turning wall bounding contiguous portions of said channels, said partition having an end spaced from said turning wall, whereby said channels communicate with one another;
    a driven shaft disposed vertically in said tank between said end of said partition and said turning wall, said driven shaft being provided at an upper end with a surface aerator and at a lower end with at least one horizontal impeller; and
    at least one baffle member disposed in said tank partially about a lower end of said shaft including said impeller, said baffle member being attached on one side to said partition and spaced from a floor surface of said tank.

22. The system defined in claim 21 wherein said baffle member extends about said impeller through an angle of about 180 degrees.

23. An orbital wastewater treatment system comprising:
    a tank;
    a partition disposed in said tank to define a pair of channels in said tank, said tank having a turning wall bounding contiguous portions of said channels, said partition having an end spaced from said turning wall, whereby said channels communicate with one another;
    a driven shaft disposed vertically in said tank between said end of said partition and said turning wall, said driven shaft being provided at an upper end with a surface aerator and at a lower end with at least one horizontal impeller; and
    at least one baffle member disposed in said tank partially about a lower end of said shaft including said impeller, said baffle member taking the form of a cylindrical section attached to and extending upwardly a floor surface of said tank, said baffle member being disposed on a side of said impeller opposite said partition.

24. The system defined in claim 23 wherein said baffle member extends about said impeller through an angle of about 180 degrees.

25. A fluid moving assembly for an orbital wastewater treatment system including a tank and a partition disposed in said tank to define a pair of channels in said tank, said tank having a turning wall bounding contiguous portions of said channels, said partition having an end spaced from said turning wall, whereby said channels communicate with one another, comprising:
    a driven shaft disposable vertically in said tank between said end of said partition and said turning wall;
    a surface aerator provided at an upper end of said shaft;
    at least one horizontal impeller provided at lower end of said shaft; and
    at least one baffle member disposable in said tank partially about a lower end of said shaft including said impeller.

* * * * *